United States Patent
Wang

(10) Patent No.: US 12,282,441 B2
(45) Date of Patent: Apr. 22, 2025

(54) DATA TRANSFER DEVICE FOR SYNCHRONOUS CONTROL OF COMPUTERS AND CONTROL METHOD THEREOF

(71) Applicant: PURPLELEC INC. CO., Ltd, Shenzhen (CN)

(72) Inventor: Qiang Wang, Shenzhen (CN)

(73) Assignee: PURPLELEC INC. CO., Ltd, Shenzhen (CN)

(*) Notice: Subject to any disclaimer, the term of this patent is extended or adjusted under 35 U.S.C. 154(b) by 36 days.

(21) Appl. No.: 18/235,298

(22) Filed: Aug. 17, 2023

(65) Prior Publication Data

US 2024/0362177 A1    Oct. 31, 2024

(30) Foreign Application Priority Data

Apr. 25, 2023    (CN) .......................... 202310453571.X

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01)

(58) Field of Classification Search
CPC .......................... G06F 13/382; G06F 13/4282
See application file for complete search history.

(56) References Cited

U.S. PATENT DOCUMENTS

| | | | |
|---|---|---|---|
| 2014/0013388 A1* | 1/2014 | Chandrasekhar | G06F 21/85 726/3 |
| 2016/0224493 A1* | 8/2016 | Wang | G06F 13/24 |
| 2018/0053019 A1* | 2/2018 | Balakrishnan | G06F 13/102 |
| 2020/0285778 A1* | 9/2020 | Soffer | G06F 1/182 |
| 2022/0011874 A1* | 1/2022 | Soffer | G06F 13/4282 |

* cited by examiner

*Primary Examiner* — Henry Tsai
*Assistant Examiner* — Harry Z Wang
(74) *Attorney, Agent, or Firm* — Birchwood IP

(57) ABSTRACT

The present disclosure provides a data transfer device for synchronous control of computers, comprising a PCB board integrated with a USB high-speed sharing chip, a keyboard and mouse emulation chip, and a shared disk, the data transfer device further includes a microcontroller, which is connected with the USB high-speed sharing chip, the keyboard and mouse emulation chip, and the shared disk, respectively, and the PCB board also integrates a hub mechanism. The data transfer device's microcontroller allows a user to simultaneously access two computers, and the combination of the shared disk and the USB high-speed sharing chip enables fast data exchange between the two computers, thereby achieving visual transformation between the two computers. The data transfer device also functions as a hub, allowing connection of different types of devices.

8 Claims, 2 Drawing Sheets

DATA TRANSFER DEVICE FOR SYNCHRONOUS CONTROL OF COMPUTERS AND CONTROL METHOD THEREOF

CROSS-REFERENCE TO RELATED APPLICATIONS

This is a U.S. patent application which claims the priority and benefit of Chinese Patent Application Number 202310453571.X, filed on Apr. 25, 2023, the disclosure of which is incorporated herein by reference in its entirety.

TECHNICAL FIELD

The present disclosure relates to the field of data transfer device, and more particularly to a data transfer device for synchronous control of computers and a control method thereof.

BACKGROUND

With the rapid development of modern society, more and more people use computers. Computers are upgraded at a fast pace, and the storage capacity of a hard disk is increasing. During office work, it is often necessary to share data and files between two computers. Typically, people use an USB flash drive or software on a computer to transfer data and files from one computer to another computer. However, this method is not suitable for transferring large memory files, since the operation is cumbersome and the transfer process is slow. Therefore, data transfer devices were invented.

Existing data transfer devices, also known as hard-disk data transfer devices, can clone all data on a hard disk through physical copying and then transfer the copied data to another hard disk. As it is a physical copying process, it retains data storage records, enabling data recovery and other operations. Moreover, this copying method can be used independently of a computer and can adjust the copying speed according to the need of users. However, these data transfer devices require simultaneous operation of two computers by the user, which is inconvenient for the user, and it is very troublesome when users need to simultaneously access the two computers and their data.

Chinese patent document with the application number CN201611243804.X discloses a multifunctional hard-disk data transfer device, which includes a display, a central processing unit, an input device, a charging device, a housing, at least two USB interfaces, and a charger. This data transfer device allows data transfer between two devices. However, it has a single type of interface, which cannot transfer data between different types of devices. Besides, it also cannot achieve simultaneous access to two computers and their data, and thus lacking sufficient functionality.

Therefore, it is necessary to design a data transfer device for synchronous control of computers and a control method thereof.

SUMMARY

In view of the technical deficiencies in the background, the present disclosure provides a data transfer device for synchronous control of computers and a control method thereof. The data transfer device's microcontroller allows a user to simultaneously access two computers, and the combination of a shared disk and a USB high-speed sharing chip enables fast data exchange between the two computers, thereby achieving visual transformation between the two computers. This control method facilitates the calling of data and files when working with two computers simultaneously, enabling data integration, data calling and data intercommunication between the two computers. The data transfer device also functions as a hub, allowing connection of different types of devices.

The present disclosure solves the above technical problems and meets practical requirements. The specific technical solutions are described below.

A data transfer device for synchronous control of computers comprises a PCB board, which integrates a USB high-speed sharing chip, a keyboard and mouse emulation chip, and a shared disk. The data transfer device further includes a microcontroller, which is connected with the USB high-speed sharing chip, the keyboard and mouse emulation chip and the shared disk. The PCB board also integrates a hub mechanism.

Furthermore, the hub mechanism comprises a plurality of interfaces electrically connected to the shared disk and the microcontroller. The interfaces include at least one of a Mini USB interface, a Micro USB interface, a Type-C interface, a VGA interface, a PCMCIA interface, a CF interface, and a HDMI interface.

A method for synchronous control of computers comprises the following steps:

step S1: connecting the data transfer device to a first computer and a second computer, and sending key information to the first computer and the second computer respectively;

step S2: recognizing the key information by the first computer and the second computer, and authorizing the data transfer device after recognizing the correct key information;

step S3: sending a transfer command to the first computer, so that the first computer transfers data to the shared disk of the data transfer device, via a USB interface, upon receiving the transfer command; and sending a transfer command to the second computer, so that the second computer transfers data to the shared disk of the data transfer device, via a USB interface, upon receiving the transfer command;

step S4: sending a acquiring command to the first computer, so that the first computer acquires data from the shared disk, via a USB interface, upon receiving the acquiring command; and sending a acquiring command to the second computer, so that the second computer acquires data from the shared disk, via a USB interface, upon receiving the acquiring command; and step S5: sending a control command to the data transfer device by the first computer, so that the data transfer device sends a control request to the second computer, and the second computer executes the control command.

Further, in the step S2, any of the first and second computers does not authorize the data transfer device and disconnects from the data transfer device when identifying incorrect key information.

Further, in the step S3, a user sends the transfer command to the first computer using a mouse and a keyboard, and upon receiving the transfer command, the first computer executes a program to transfer data to the data transfer device, and the data transfer device receives the data via a first computer USB interface and stores it in the shared disk; and the user sends the transfer command to the second computer using the mouse and the keyboard, and upon receiving the transfer command, the second computer executes a program to transfer data to the data transfer device, and the data transfer device receives the data via a second computer USB interface and stores it in the shared disk.

Further, in the step S4, the user sends the acquiring command to the first computer using a mouse and a keyboard, and upon receiving the acquiring command, the first computer executes a program to obtain data from the data transfer device, which transfers the data in the shared disk to the first computer via the USB high-speed sharing chip; and the user sends the acquiring command to the second command using the mouse and the keyboard, and upon receiving the acquiring command, the second computer executes a program to obtain data from the data transfer device, which transfers the data in the shared disk to the second computer via the USB high-speed sharing chip.

Further, in the steps S3 and S4, running a program to create a virtual window corresponding to the second computer in the first computer, the user drags the data in the first computer into the window through the mouse dragging and sends a transmission command to the data transfer device, which receives the data dragged from the first computer through the shared disk after receiving the transmission command, and which transmits the data to the second computer by running a program after receiving the data; and running a program to create a virtual window corresponding to the first computer in the second computer, the user drags the data in the second computer into the window through the mouse dragging and sends a transmission command to the data transfer device, which receives the data dragged from the second computer through the shared disk after receiving the transmission command, and which transmits the data to the first computer by running a program after receiving the data, and the data includes videos, audios and data files.

Further, in the step S3, after the data transfer device receives the transmission command, the microcontroller will control the USB high-speed sharing chip to transmit the required data to the shared disk, and then the microcontroller will control the USB high-speed sharing chip to transmit the data from the shared disk.

Further, in the step S5, running a program to create a virtual window corresponding to the second computer in the first computer, the user edits a control command in the window using a mouse and a keyboard, sends the control command to the data transfer device, which sends the control command to the second computer, and the second computer executes the control command and displays it in the window. The control command includes playing audio, installing software, authorizing and copying and pasting.

Further, in the step S5, after creating a virtual window corresponding to the second computer in the first computer, the microcontroller will control the keyboard and mouse simulation chip to simulate the keyboard and mouse corresponding to the second computer in the window, and the user will send a control command to the second computer through the simulated keyboard and mouse, and the second computer will execute the control command after receiving the control command.

The data transfer device for synchronous control of computers and the control method thereof provided by the present disclosure have the following advantages compared to the prior art:

the data transfer device in the present disclosure allows the setup of a window in one computer that corresponds to the other computer, enabling visual control between the two devices, thus achieving simultaneous access to the two computers for the users, and the shared disk and USB high-speed sharing chip in the data transfer device enable fast data exchange between the two computers, allowing the simultaneous calling of data of both computers for the users.

DETAILED DESCRIPTION

The embodiments of the present disclosure will be described below with reference to the attached drawings. It should be noted that the embodiments presented are not limited to the examples shown, and the related necessary components in the art described in the present disclosure should be regarded as a common technology in the art and can be known and mastered by those skilled in the art.

Figure 1:
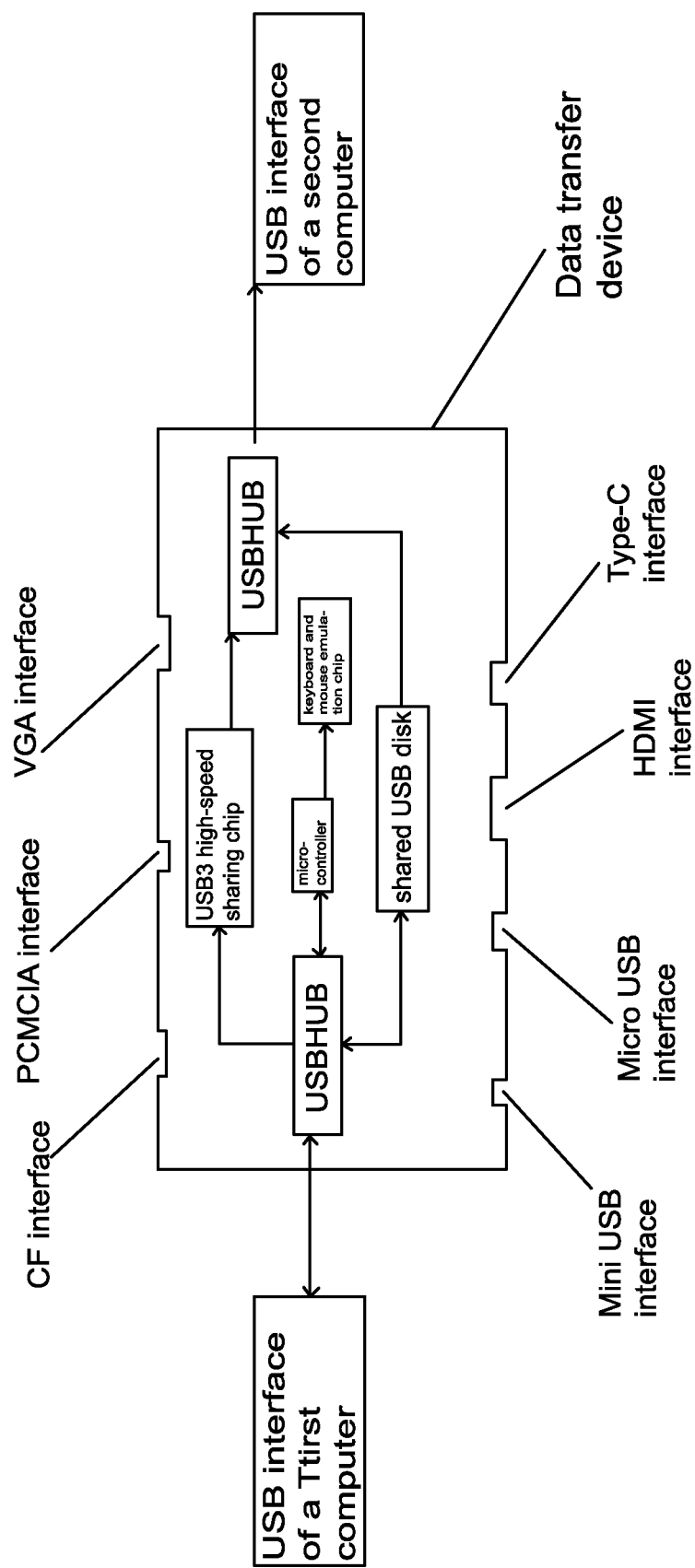
FIG. 1 illustrates the schematic diagram of a data transfer device connected to a first computer and a second computer.

Referring to FIG. 1, a data transfer device (duplicator) for synchronous control of computers is provided. The data transfer device comprises a PCB board integrated with a USB3 (USB 3.0) high-speed sharing chip, a keyboard and mouse emulation chip, and a shared disk. Additionally, the data transfer device includes a microcontroller connected to the USB3 high-speed sharing chip, the keyboard and mouse emulation chip, and the shared disk, respectively. The PCB board also integrates with a hub mechanism. The shared disk within the data transfer device facilitates data storage, and the USB3 high-speed sharing chip accelerates data transmission. The cooperation of the shared disk and the USB3 high-speed sharing chip enables fast transfer of data from the computer to the shared disk. The microcontroller within the data transfer device allows for the implementation of a program which is configured to be executed such that the microcontroller controls the computer to transfer or receive data to/from the shared disk, and the USB3 high-speed sharing chip enhances the speed of data transmission. When the data transfer device is connected to two computers, it enables data exchange between them. Furthermore, the microcontroller can create a virtual window in one computer corresponding to the other computer. The keyboard and mouse emulation chip facilitates the virtualization of the keyboard and mouse in the window, enabling control over the other computer. This allows users to simultaneously access both computers and their respective data.

The hub mechanism comprises a plurality of interfaces that are electrically connected to the shared disk and microcontroller, respectively. These interfaces include a Mini USB interface, a Micro USB interface, a Type-C interface, a VGA interface, a PCMCIA interface, a CF interface, and a HDMI interface. These interfaces not only enable the connection of the two computers but also facilitate the transfer of data from various types of devices to the computer, providing strong versatility.

Figure 2:
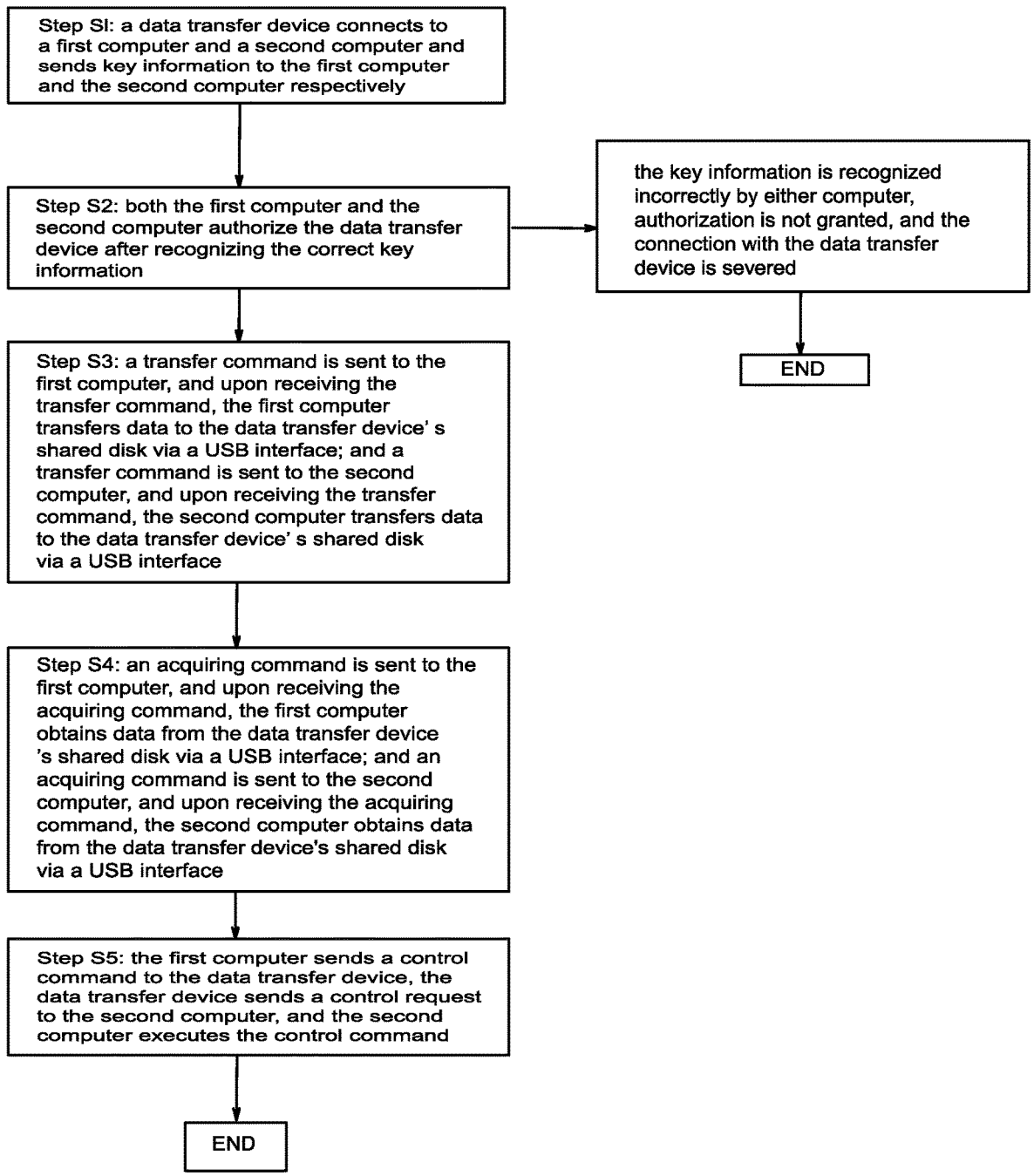
FIG. 2 illustrates the flowchart of the method for achieving synchronous control of computers.

Referring to FIG. 2, a method for achieving synchronous control of computers is provided, which comprises the following steps:

step S1: a data transfer device connects to a first computer and a second computer and sends key information to the first computer and the second computer respectively; the first computer and the second computer set up authorization keys, and the microcontroller within the data transfer device respectively sends a designated private key to the first computer and the second computer via a USB interface.

step S2: the data transfer device is authorized after the first computer and the second computer upon correctly recognizing the key information; if the key information is recognized incorrectly by either computer, authorization is not granted, and the connection with the data transfer device is severed. The received private key is compared with the set authorization key within the first computer and the second computer, if the private key is correct (the received private key matches the set authorization key), authorization is granted to the private key; once authorized, the data transfer device installs a program within the first computer and/or the second computer; and if the private key is incorrect (the received private key does not match the set authorization key), authorization is not granted, and the connection with the data transfer device is severed.

step S3: a transfer command is sent to the first computer, and upon receiving the transfer command, the first computer transfers data to the shared disk of the data transfer device via a USB interface; and a transfer command is sent to the second computer, and upon receiving the transfer command, the second computer transfers data to the data transfer device's shared disk via a USB interface;

the user sends the transfer command to the first computer using a mouse and a keyboard, and upon receiving the transfer command, the first computer executes a program to transfer data to the data transfer device, which receives the data via the USB interface of the first computer and stores it in the shared disk;

the user sends the transfer command to the second command using a mouse and a keyboard, and upon receiving the transfer command, the second computer executes a program to transfer data to the data transfer device, which receives the data via the USB interface of the second computer and stores it in the shared disk; and after the data transfer device receiving a transfer command, the microcontroller controls the USB3 high-speed sharing chip to transfer the required data to the shared disk, and then the microcontroller controls the USB3 high-speed sharing chip to transmit the data from the shared disk.

step S4: an acquiring command is sent to the first computer, and upon receiving the acquiring command, the first computer obtains data from the shared disk of the data transfer device via a USB interface, and an acquiring command is sent to the second computer, and upon receiving the acquiring command, the second computer obtains data from the shared disk of the data transfer device via a USB interface;

the user sends the acquiring command to the first computer using a mouse and a keyboard, and upon receiving the acquiring command, the first computer executes a program to retrieve data from the data transfer device, which transfers the data in the shared disk to the first computer via the USB3 high-speed sharing chip;

the user sends the acquiring command to the second command using a mouse and a keyboard, and upon receiving the acquiring command, the second computer executes a program to retrieve data from the data transfer device, which transfers the data in the shared disk to the second computer via the USB3 high-speed sharing chip;

running a program leads to a virtual window corresponding to the second computer in the first computer, the user drags the data of the first computer into the window through the mouse dragging and sends a transmission command to the data transfer device, the data transfer device receives the data from the first computer through the shared disk after receiving the transmission command, and transmits the data to the second computer by running a program after receiving the data; and running a program leads to a virtual window corresponding to the first computer in the second computer, the user drags the data of the second computer into the window through the mouse dragging and sends a transmission command to the data transfer device, the data transfer device receives the data dragged from the second computer through the shared disk after receiving the transmission command, and transmits the data to the first computer by running a program after receiving the data, and the data includes videos, audios and data files.

step S5: the first computer sends a control command to the data transfer device, the data transfer device sends a control request to the second computer, and the second computer executes the control command;

running a program to create a virtual window representing the second computer in the first computer; the user uses or edits a control command in the window using a mouse and a keyboard, sends the control command to the data transfer device, which sends the control command to the second computer; and the second computer executes the control command and displays it in the window; the control command includes playing audio, installing software, authorizing and copying and pasting; and after creating a virtual window representing the second computer in the first computer, the microcontroller will control the keyboard and mouse simulation chip to simulate the keyboard and mouse corresponding to the second computer in the window, and the user will send a control command to the second computer through the simulated keyboard and mouse, and the second computer will execute the control command after receiving the control command.

The method of a data transfer device for synchronous control of computers is described below.

After connecting the data transfer device to the first and second computers and obtaining authorization, a program is executed to create a virtual window corresponding to the second computer in the first computer's desktop. The window can display the videos and audios from the second computer. By dragging the videos and audios within the window to the first computer's desktop, the videos and audios from the second computer can be played on the first computer in the first computer's desktop, achieving synchronized display of videos and audios between the two computers.

The window corresponding to the second computer can also simulate a keyboard and a mouse using the data transfer device's keyboard and mouse emulation chip. Using the keyboard and mouse of the first computer to send a command in the window, the second computer can execute the command, thus enabling visual remote control of the second computer within the first computer. The user can also drag data displayed within the window to the first computer's desktop or vice versa, facilitating data sharing between the first computer and the second computer. The USB3 high-speed sharing chip within the data transfer device accelerates this data sharing process, thus improving user experience. Furthermore, data sharing can be accomplished using the keyboard's clipboard or shortcuts, providing convenience to the user.

Both the first computer and the second computer are capable of using the clipboard of the first computer. Additionally, the first computer can control the second computer to install software via the data transfer device and grant authorization to the software.

This data transfer device, utilizing the microcontroller, enables visual control between two computers. Through the shared disk and USB3 high-speed sharing chip, data sharing between the two computers is achieved. When a user requires simultaneous control of both computers, the data transfer device allows easy access to both computers and their data through a single computer. By inputting commands within the window of the first computer, the user can control the second computer. Data sharing between the two computers is accomplished through drag-and-drop actions and keyboard shortcuts. The data transfer device incorporates the functionality of a hub and is equipped with a plurality of interfaces of different types that are electrically connected to the microcontroller, enabling data transfer from various devices to the computer. With its powerful functionality and versatility, the data transfer device is highly advantageous.

The above description represents preferred embodiments of the present disclosure. It should be noted that modifications and improvements can be made by those skilled in the art.

What is claimed is:

1. A method for synchronous control of computers by using a data transfer device for synchronous control of computers, characterized by comprising:
   step S1: connecting the data transfer device to a first computer and a second computer, and sending key information to the first computer and the second computer respectively;
   step S2: recognizing the key information by the first computer and the second computer, and authorizing the data transfer device after recognizing the correct key information;
   step S3: sending a transfer command to the first computer, so that the first computer transfers data to the shared disk of the data transfer device, via a USB interface, upon receiving the transfer command; and sending a transfer command to the second computer, so that the second computer transfers data to the shared disk of the data transfer device, via a USB interface, upon receiving the transfer command;
   step S4: sending a acquiring command to the first computer, so that the first computer acquires data from the shared disk, via a USB interface, upon receiving the acquiring command; and sending a acquiring command to the second computer, so that the second computer acquires data from the shared disk, via a USB interface, upon receiving the acquiring command; and
   step S5: sending a control command to the data transfer device by the first computer, so that the data transfer device sends a control request to the second computer, and the second computer executes the control command;
   wherein the data transfer device comprises:
   a PCB board integrated with a USB high-speed sharing chip,
   a keyboard mouse emulation chip,
   a shared disk,
   a microcontroller that is connected with the USB high-speed sharing chip, the keyboard and mouse emulation chip and the shared disk,
   the PCB board is integrated with a hub mechanism, and the hub mechanism comprises a plurality of interfaces electrically connected to the shared disk and the microcontroller, and the interfaces comprise at least one of a Mini USB interface, a Micro USB interface, a Type-C interface, a VGA interface, a PCMCIA interface, a CF interface, and a HDMI interface.

2. The method according to claim 1, characterized in that in the step S2, any of the first and second computers does not authorize the data transfer device and disconnects from the data transfer device when identifying incorrect key information.

3. The method according to claim 1, characterized in that in the step S3, a user sends the transfer command to the first computer using a mouse and a keyboard, and upon receiving the transfer command, the first computer executes a program to transfer data to the data transfer device, and the data transfer device receives the data via a first computer USB interface and stores it in the shared disk; and
   the user sends the transfer command to the second computer using the mouse and the keyboard, and upon receiving the transfer command, the second computer executes a program to transfer data to the data transfer device, and the data transfer device receives the data via a second computer USB interface and stores it in the shared disk.

4. The method according to claim 1, characterized in that in the step S4, the user sends the acquiring command to the first computer using a mouse and a keyboard, and upon receiving the acquiring command, the first computer executes a program to obtain data from the data transfer device, which transfers the data in the shared disk to the first computer via the USB high-speed sharing chip; and
   the user sends the acquiring command to the second command using the mouse and the keyboard, and upon receiving the acquiring command, the second computer executes a program to obtain data from the data transfer device, which transfers the data in the shared disk to the second computer via the USB high-speed sharing chip.

5. The method according to claim 1, characterized in that in the steps S3 and S4, executing a program to create a virtual window corresponding to the second computer in the first computer, the user drags the data in the first computer into the window through the mouse dragging and sends a transmission command to the data transfer device, the data transfer device receives the data dragged from the first computer through the shared disk after receiving the transmission command, and transmits the data to the second computer by running a program after receiving the data; and
   executing a program to create a virtual window corresponding to the first computer in the second computer, the user drags the data in the second computer into the window through the mouse dragging and sends a transmission command to the data transfer device, the data transfer device receives the data dragged from the second computer through the shared disk after receiving the transmission command, and transmits the data to the first computer by running a program after receiving the data, and wherein the data includes videos, audios and data files.

6. The method according to claim 5, characterized in that in the step S3, after the data transfer device receives the transmission command, the microcontroller will control the USB high-speed sharing chip to transmit the required data to the shared disk, and then the microcontroller will control the USB high-speed sharing chip to transmit the data from the shared disk.

7. The method according to claim 1, characterized in that in the step S5, running a program to create a virtual window corresponding to the second computer in the first computer, the user edits a control command in the window using a mouse and a keyboard, and sends the control command to the data transfer device, the data transfer device sends the control command to the second computer, and the second computer executes the control command and displays it in the window, and wherein the control command includes playing audio, installing software, authorizing and copying and pasting.

8. The method according to claim 7, characterized in that in the step S5, after creating a virtual window in the first computer, the microcontroller controls the keyboard and mouse simulation chip to simulate the keyboard and mouse corresponding to the second computer in the window, and the user sends a control command to the second computer through the simulated keyboard and mouse, and the second computer executes the control command after receiving the control command.

* * * * *